Nov. 2, 1965     R. W. BUTSCH     3,214,786

CASTER WHEEL SCRAPER

Filed Nov. 15, 1962

INVENTOR.
RICHARD W. BUTSCH
BY
*Lockwood, Woodard, Smith & Weikart*
Attorneys 3,214,786
CASTER WHEEL SCRAPER
Richard W. Butsch, Evansville, Ind., assignor to Faultless Caster Corporation, Evansville, Ind., a corporation of Indiana
Filed Nov. 15, 1962, Ser. No. 237,997
6 Claims. (Cl. 16—41)

This invention relates generally to casters and more particularly to a scraper suitable for employment with a wide variety of casters to prevent accumulation of foreign matter in the casters and resultant interference with operation thereof.

In many industries, carts and trucks and other devices are equipped with caster wheels which are subjected to accumulation of dirt and foreign matter of all kinds in their operation. One example of an industry where this is the case is the textile industry. The problems encountered with casters used in the textile industry and features desirable in such casters are described in a co-pending application of Richard W. Butsch entitled "Anti-Fouling Caster," bearing Serial No. 159,619 and filed December 16, 1961.

It is apparent that many conventional casters are presently in use in the textile industry, where casters are constantly subjected to fouling. Therefore, while the caster described in the aforementioned application is extremely effective in the achievement of its objectives, there remains the need for a suitable device for use with conventional casters to minimize or avoid the fouling thereof.

It is, therefore, a general object of the present invention to provide improved means for avoiding the fouling of casters.

A further object is to provide means well suited to employment with conventional casters.

A further object is to provide means for actually scraping debris from the tread of a caster wheel.

A still further object is to provide means for scraping debris from the tread of a caster wheel, which means is constructed to avoid applying any significant braking action during the scraping function.

Described briefly, a typical embodiment of the present invention employs a generally U-shaped rectangular frame of flexible material having a pair of blades extending in parallel spaced relation. The blades are so shaped and sharpened to rest on the tread of a caster wheel and be supported thereby. The frame is so mounted as to be moved into engagement with the caster frame or horn upon rotation of the wheel in either direction, to further implement the scraping action and yet avoid applying any significant braking action to the wheel.

The full nature of the invention will be understood from the accompanying drawings and the following description and the claims.

Figure 1:
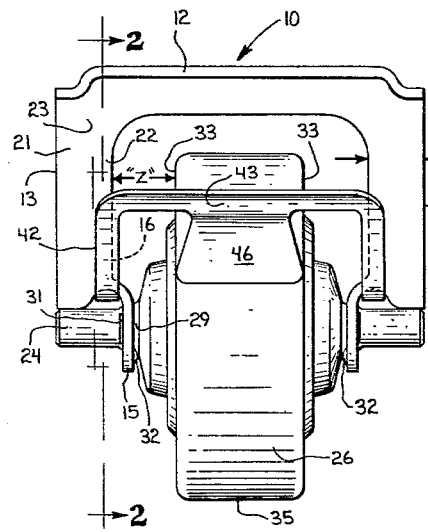
FIG. 1 is a front elevational view of a typical embodiment of the present invention.

Referring to the drawings, the caster employing the scraper according to the present invention includes a frame 10 which is an integral unit of parallel front and rear cross members, 11 and 12 respectively, maintaining the generally U-shaped side members 13 and 14 in parallel spaced relation. Obviously, therefore, the frame 10 appears to be rectangular when viewed from above or below. However, the frame of the caster of this invention can take other forms and some of such other forms could appear when viewed from above or below as circular, elliptical or octagonal, for example.

The frame or horn in the type of caster shown is typically mounted directly to the underside of a hand truck. However, it can also be mounted to the underside 10A of a hand truck through a suitable ball bearing 10B to allow turning of the caster. The frame may, for example, be stamped from a blank of cold rolled steel sheet having a thickness of .095 inch.

A wing or projection 15, integral with the side member 13 extends from the inner edge 16 thereof inwardly and then downwardly parallel to edge 16 and has a cut-out 17 therein to provide a yoke between the forward and rear portions, 19 and 18 respectively, of the wing. An identical wing projects inwardly and downwardly from the inner edge of the side member 14, in a plane parallel to the inner edge thereof and parallel to that of projection 15.

Figure 2:
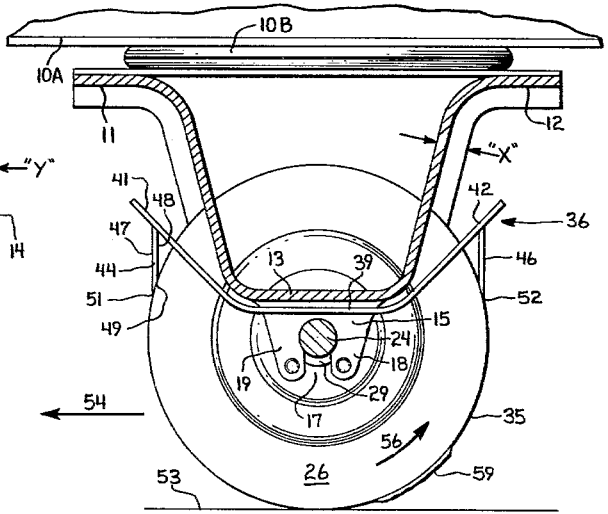
FIG. 2 is a section taken along the line 2—2 of FIG. 1.

As can be appreciated from FIG. 1, the side members of the frame are so formed that the outer portion 21 and inner portion 22 thereof are offset from each other by the intermediate portion 23. In this manner, the strength necessary to sustain longitudinal loads and vertical loads on the caster is achieved while the thickness of the side member inner edge 16 (FIG. 1) facing the wheel is extremely small, .095 inch, for example. Even the projected thickness "X" (FIG. 2) of the members measured transverse to the axle 24, is only approximately half the thickness "Y" measured (FIG. 1) in the direction parallel to the axle 24. Thus, the great majority of the entire mass of the side members is in planar sheet form perpendicular to the sides of the wheel, and parallel to the axle.

A wheel 26 is mounted to the axle 24 through suitable ball bearing assemblies. The member 29 may either be a portion of the inner bearing race for example, or it may be a spacer disposed around the axle and abutting an inner race. The spacer also abuttingly engages the wing 15. The wheel and axle assembly is mounted on the caster frame or horn by virtue of the slots or grooves 31 in the axle. The slotted portion of the axle is received in the cutout 17, and because of the arrangement of the axles, can not turn in the frame. In this manner, wear which might otherwise occur is avoided. The assembly is retained in the cutout 17 by means of the bosses 32 engaging the members 29. By variation of the size of the bosses, variation can be achieved in the amount of force required to either remove or replace the wheel or axle assembly in the frame.

As described in the afore-mentioned application, with a caster of the type shown, a substantial space "Z" is provided between the inner edge 16 of the side members and the sides 33 of the wheel. By virtue of this great space and the small area of the inside edge 16 facing the wheel side 33, lint will not accumulate between the frame and the wheel to impede rotation of the wheel. Thus, with the caster including the structure thus far described, lint cannot normally become a problem nor can reasonable amounts of other foreign matter.

However, it may be appreciated that even with a caster of the type shown, lint or other debris can accumulate on the tread 35 of the wheel. Also, in conventional casters not having the features of the horn of the illustrated caster, a substantial accumulation of lint can occur around the axle unless some means are provided to avoid this result. Therefore, according to the present invention, a scraper 36 is provided having a generally U-shaped configuration when viewed from the side, and a generally rectangular configuration when viewed from above. More specifically, the scraper has generally U-shaped side members comprising the base portion or leg 39 and diverging arm portions 41 and 42. These side members are in parallel, horizontally-spaced relation and the front and rear end of each is connected to the front and rear end of the other by an end member 43. The end members are, therefore, in fore and aft horizontally-spaced parallel relation.

Front and read scraper blades 44 and 46 respectively extend downwardly from the end members 43 and may typically be disposed in parallel planes as in the illustrated embodiment. Blade 44 has a front surface 47, a parallel rear surface 48 and a surface 49 intersecting the front surface at an acute angle. Where the surface 49 is planar, the angle between this surface and front surface 47 may be approximately fifteen degrees, for example. Thus, a sharp edge 51 is provided for contact with the tread 35 of the wheel.

Inasmuch as the horizontal distance between the sharp edge 51 of the front blade and the sharp edge 52 of the rear blade is less than the diameter of the wheel, the blades are supported by the wheel and thereby the scraper is supported by the wheel.

As the wheel advances over the floor 53 in the direction of the arrow 54, rotation of the wheel is, of course, as indicated by the arrow 56. Contact between the rear blade and the tread of the wheel tends to rotate the scraper to the limited degree illustrated in FIG. 3 wherein the curved face 57 of the caster frame side member is engaged by the corresponding curved portion 58 of the scraper side member. Then any debris 59 which has collected on the tread of the wheel is peeled away as at 59A by the sharp edge of the scraper which is in contact with the tread of the wheel.

Figure 3:
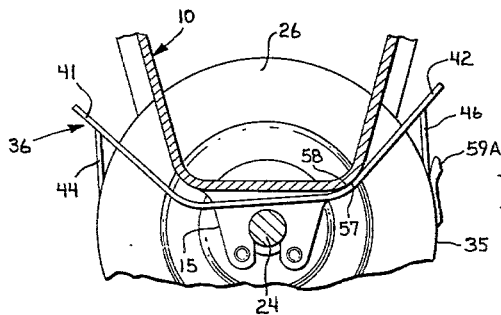
FIG. 3 is a fragmentary section as in FIG. 2 and illustrating the action of the scraper.
Figure 4:
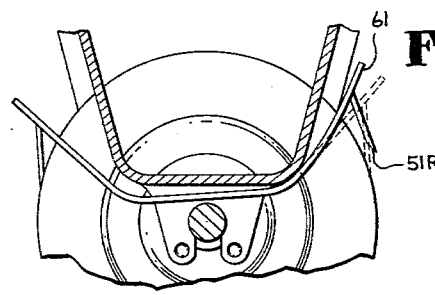
FIG. 4 is a section similar to FIG. 3 and illustrating a further type of action of the scraper.

In the case where the debris is so adherent to the wheel or in such a large amount so it cannot all be removed at once, the flexibility of the scraper will permit it to be deflected from the position shown in the dotted outline of FIG. 4, which corresponds to the position of FIG. 3, to the position shown by the solid outline in FIG. 4 and designated by reference numeral 61. Thus, the edge 51R of the rear scraper blade is separated from the tread of the wheel permitting a portion of the debris to continue around while a portion can also be removed from the wheel. In this manner, the present invention avoids applying any significant braking load on the wheel even though a substantial amount of debris may be present or even though the debris may be quite adherent to the wheel. During continued rotation of the wheel, segments of debris can be removed until the wheel is clean without interfering with wheel operation or overloading the scraping device.

While the present invention can be employed with only one scraping blade by simply providing some means of retaining the scraper frame supported within a reasonable area, two blades are usually desirable, particularly where the caster frame is secured directly to the hand truck. In this manner, one blade provides scraping action for one direction of wheel rotation and the other blade provides scraping action for the opposite direction of wheel rotation.

With the distance between the wheel contacting portions of the blade being less than the diameter of the wheel, correct support and positioning of the scraper is assured. Where the wheel is provided with a hard tread surface, rotation thereof is effective to sharpen the blades and eventually the surface 49 can become slightly concave in a manner similar to a hollow ground blade. Thus the blade is always maintained sharp.

The scraper may be made of a hard resilient material such as tempered spring steel. However, plastic or other suitable materials that possess resilient properties may be found acceptable. Resilient material is desired to permit the device to deflect under large forces and permit some debris to pass between the wheel and the blades. This deflection ability controls the braking effect of the device and also assures a suitable operating life of the device. The ability of the device to deflect and remove debris in increments assures smooth operation of trucks whose wheels use this device.

It should be mentioned at this point that while the blades are self-sharpening, the sharpening action does not at all alter the effectiveness of, nor interfere with, the action of the scraper. Also, the presence of debris tends to increase the contact between the sharp edge of the blade and the wheel tread to increase the effectiveness of the scraping action. Also, it is apparent that the scraper can withstand rough usage without the loss of effectiveness. Also, it is quite easy to install and can readily be employed with conventional wheels or casters.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A wheel scraper comprising: a plate having two generally U-shaped side members with end members extending between said side members, the "U" of each of said side members having a base leg lying in a common plane with the base leg of the other of said side members, and a blade extending from one of said end members and extending in a plane substantially normal to said common plane.

2. In combination, an axle; a wheel on said axle; a frame supporting said axle and having mounting means for attachment to a cart and the like to be supported thereby; a scraper blade having first and second surfaces intersecting in an acute angle, said first surface engaging the tread of said wheel; and a scraper blade mounting frame having a leg disposed between said axle and said mounting means and having an arm supporting said blade and engaging said frame to hold said first surface in engagement with said thread.

3. A caster comprising: an axle; a wheel on said axle; a member supporting said axle and having mounting means thereon for attachment to a cart and the like to be supported by said caster; a scraper blade; a blade mounting member connected to said blade and movable fore and aft with respect to said axle supporting member in response to forward and rearward rotation of said wheel; a blade on said blade mounting member and engaging said wheel, a portion of said blade mounting member being located to engage a portion of said axle supporting member for limiting the relative movement between said members to hold said blade in engagement with said wheel during rotation of said wheel in one direction.

4. In combination: an axle; a wheel on said axle; a member supporting said axle; a scraper blade having an edge in contact with and supported by the tread of said wheel; and a scraper frame mounting said blade, said scraper frame being movably mounted between said supporting member and said axle and confined by the combination of said wheel and said supporting member, said frame engaging said supporting member during rotation of said wheel in one direction to hold said edge in contact with said wheel.

5. A wheel scraper comprising: a plate having two generally U-shaped side members with end members extending between said side members, each side member having a base leg lying in a first plane with the base leg of the other side member, and each side member having a first arm portion coplanar with a first arm portion of the other side member, said first portions lying in a second plane, and each side member having a second arm portion coplanar with a second arm portion of the other side member and lying in a third plane intersecting said second plane, said first plane intersecting said second and third planes, and a blade extending from one of said end members, said blade lying in a fourth plane normal to said first plane and said blade having first and second sharply intersecting surfaces to form an edge for scraping debris from a wheel.

6. In a wheel assembly having a frame, an axle mounted to said frame, and a wheel mounted to said axle, a scraper comprising: a blade mounting member comprising first and second elongated side members and first and second elongated end members; a blade on one of said end members and having first and second intersecting surfaces thereon, with said first surface resting on the peripheral surface of said wheel and vertically supporting said blade, a said first surface intersecting said second surface at a sharply acute included angle whereby said blade is adapted to scrape debris from said peripheral surface; said blade mounting member being loosely mounted to said frame and movable in response to movement of said blade by said wheel, the movement of said blade mounting member being restrained by said frame, all portions of said blade mounting member thereby having limited freedom to move with respect to said frame.

References Cited by the Examiner

UNITED STATES PATENTS

| | | | |
|---|---|---|---|
| 158,698 | 1/75 | Gambrill et al. | 15—256.51 |
| 951,553 | 3/10 | Williams et al. | 16—41 |
| 2,077,919 | 4/37 | Engstrom | 16—41 |
| 2,255,113 | 9/41 | Greenleaf | 16—41 |
| 2,495,599 | 1/50 | Pinnick | 16—41 |

FOREIGN PATENTS

| | | |
|---|---|---|
| 209,592 | 1/24 | Great Britain. |

DONLEY J. STOCKING, *Primary Examiner.*